E. M. KIMBALL.
MILK CAN.
APPLICATION FILED JUNE 12, 1907.

953,844.

Patented Apr. 5, 1910.

Witnesses
G. R. Thomas
Arthur W. Crossley

Inventor
Eleanor M. Kimball
By Chandler & Chandler
Attorneys

UNITED STATES PATENT OFFICE.

ELEANOR M. KIMBALL, OF MAGRATH, ALBERTA, CANADA.

MILK-CAN.

953,844.  Specification of Letters Patent.  Patented Apr. 5, 1910.

Application filed June 12, 1907. Serial No. 378,691.

*To all whom it may concern:*

Be it known that I, ELEANOR M. KIMBALL, a subject of the King of England, residing at Magrath, in the Province of Alberta, Dominion of Canada, have invented certain new and useful Improvements in Milk-Cans; and I do hereby declare the following to be a full, clear, and exact description of the invention, such as will enable others skilled in the art to which it appertains to make and use the same.

My invention has relation to milk cans generally, and particularly to the kind in which milk is wholesaled.

It is the object of the invention to provide such improvements in milk cans of the class specified as will enhance the readiness with which they may be thoroughly cleansed so as to prevent any portion of the can from corroding, and to keep the milk from contamination by the corrosion of the can as well as to preserve the freshness and sweetness of the milk in the can.

The nature of the invention is fully and clearly ascertainable from the device illustrated in the annexed drawings, forming a part of this specification, in view of which it will first be described with respect to its construction and mode of employment, and then be pointed out in the subjoined claim.

Figure 2:
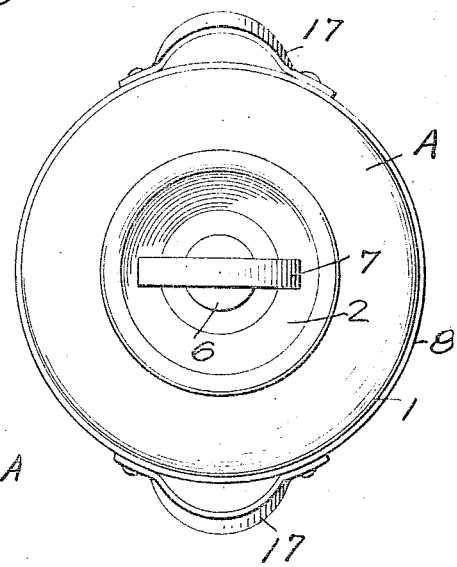
Figure 1:
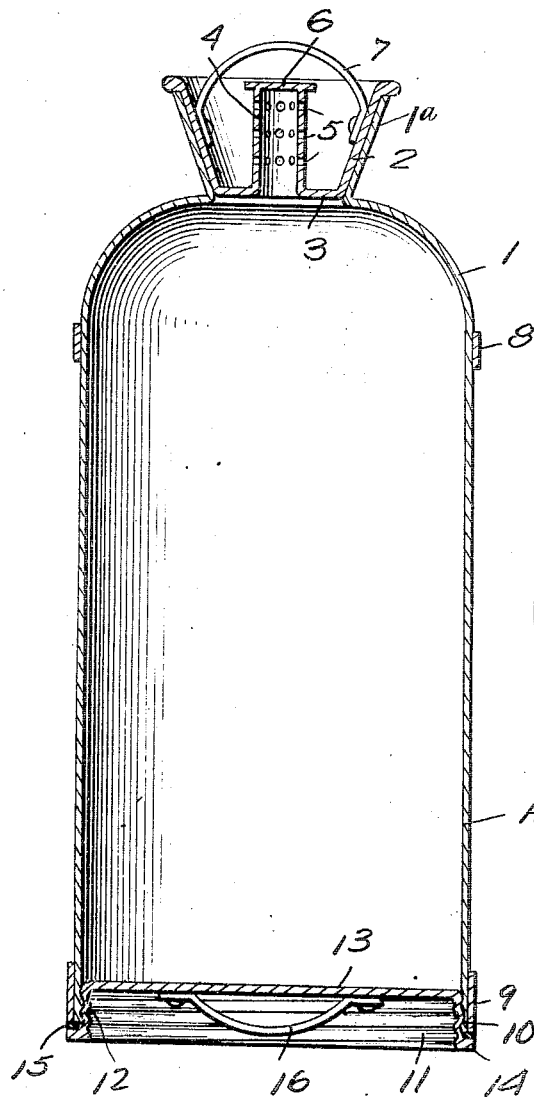

Of the said drawings—Figure 1 is a central vertical sectional view. Fig. 2 is a top plan of the can complete.

Similar characters of reference designate similar parts or features, as the case may be, wherever they occur.

In the drawings A designates the body of the can which may be of substantially cylindrical form with a rounded or dome-shaped top 1 in the center of which is formed a round hole or mouth of suitable diameter which has projecting thereabove a frusto-conical neck 1ª.

2 designates an inverted frusto-conical cover, adapted to be placed in the mouth 1 to close the same, the cover being provided with a flat bottom 3 from the center of which a vertical tube 4 with perforations 5 in its sides and covered on its top, 6, opens at its bottom into the can, being secured in place in the bottom 3 of the cover. The perforations 5 may not extend to the bottom of the tube, but be merely made through the sides of its upper portion. A strap handle 7 is secured to the inner sides of the cover and is bowed upward, as shown.

8 designates a band of strong sheet metal riveted to the upper outside margin of the can to strengthen the same. A band 9 similar to the band 8 is riveted to the bottom margin of the can to strengthen it around that part.

The can is interiorly screw-threaded at the bottom margin as at 10, to adapt it to receive the removable reëntrant bottom or inclosure 11 which is formed of stout serviceable sheet metal having a vertical rim 12, with screw-threads impressed therein corresponding to the screw-threads 10, the bottom proper 13 being practically flat, and there being a slight radiating flange or rim 14 at the lower edge. Between the said flange 14 and the bottom of the body of the can there is interposed a rubber washer 15, so as to form a tight connection between the removable bottom and the margin of the lower end of the can. A strap handle 16 is secured to the inner sides of the rim 12 of the bottom for manipulating the bottom for removing and replacing it. Handles 17 are also secured to the band 8 at the upper outside margin of the can body.

In use the cover can readily be lifted off for filling or decanting or emptying the can through the mouth at the top. When the can is emptied of milk, as soon as it is taken to a place to be washed the cover 2 will be removed and a like thing will be done with the bottom 11 which will be unscrewed by means of the strap-handle 16, carefully taking the washer 15 from its place and cleansing it in antiseptic fluid, if need be, and thoroughly washing the can inside and out, as well as the top and bottom, and leaving the can and its removable parts in the sun and air to dry and be ready for reuse when needed. As soon as it is dry and aired the bottom can be screwed in place and the can refilled with fresh warm milk, and the cover or lid put on, as the perforations 5 in the upper part of the tube 4 will afford ample ventilation or open space for the escape of all vapor and animal heat that is not radiated from the sides of the can.

By my improvements it will be seen that the difficulties of thoroughly cleansing milk cans is overcome, and the work of accomplishing the same is greatly reduced without increasing the cost of the can to any appreciable extent.

What is claimed is:—

A milk can comprising a cylindrical body having an open bottom and interiorly threaded at its lower end, a band secured around the outer face of the body and having its lower edge flush with the lower edge of said body, a detachable closure for the bottom of said can comprising a circular disk having a depending threaded annular flange extending downwardly to the lower edge of the can body and adapted for interlocking engagement with the interior threads of the body whereby the disk portion of said closure will be disposed above the lower edges of the body of the can and said band; a horizontal annular projection extending outwardly from the lower edge of the annular flange of said disk, and a gasket disposed between the said horizontal annular projection and the lower end of the body of the can, and said band, whereby the screwing of the closure into said can will compress said gasket between the horizontal projection and the lower edges of the band and body.

In testimony whereof, I affix my signature, in presence of two witnesses.

ELEANOR M. KIMBALL.

Witnesses:
C. D. Fox,
Leland Kimball.